March 8, 1927.  1,620,322
L. W. BROWNE
PRESSURE AND VACUUM CONTROL VALVE
Filed Nov. 5, 1926
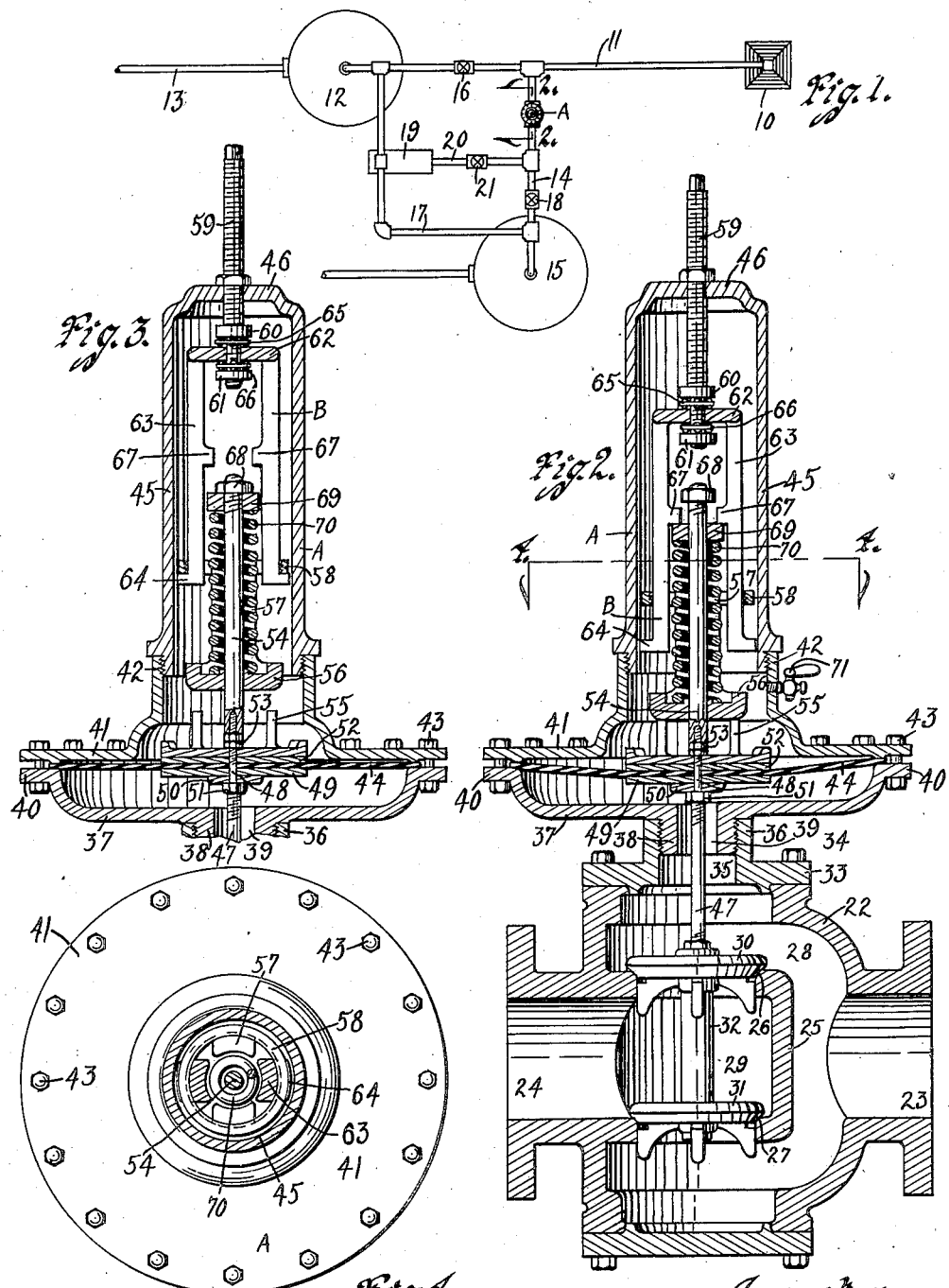
Witness
L. F. Sandberg
Inventor
Lyle W. Browne
by Bair & Freeman Attorneys Patented Mar. 8, 1927.

1,620,322

UNITED STATES PATENT OFFICE.

LYLE W. BROWNE, OF MARSHALLTOWN, IOWA, ASSIGNOR TO THE FISHER GOVERNOR COMPANY, OF MARSHALLTOWN, IOWA.

PRESSURE AND VACUUM CONTROL VALVE.

Application filed November 5, 1926. Serial No. 146,418.

The object of my invention is to provide a pressure and vacuum control valve structure particularly including a valve adapted to be adjusted for use in controlling pressure or vacuum in a fluid conducting line.

Another object is to provide in such a valve a number of features of novel structure, which make it simple and inexpensive to manufacture and install, readily adjustable, effective for use, and available for controlling the wide range of pressure and vacuum.

With these and other objects in view, my invention consists in the construction, arrangement and combination of the various parts of my pressure and vacuum control valve, whereby the objects contemplated are attained, as hereinafter more fully set forth, pointed out in my claims, and illustrated in the accompanying drawings, in which:

Figure 1 is a diagram, illustrating an installation embodying my invention.

Figure 2 is a vertical, sectional view through a pressure and vacuum control valve embodying my invention.

Figure 3 is a vertical, sectional view taken at right angles to the view shown in Figure 1, illustrating the controlling mechanism of the valve; and Figure 4 is a horizontal, sectional view taken on the line 4—4 of Figure 2.

A valve of the type, which is particularly the subject matter of the present application has a great variety of uses, wherever it is desirable to control vacuum or pressure, and especially where it is desired at times to regulate vacuum and at other times to regulate pressure in the same line.

I will here describe my invention as installed in connection with an oil well. It will, however, be understood that this particular environment of the valve is suggested simply for purposes of illustration, and that I do not want to limit my valve to any particular use.

It is well known that in many oil wells, the oil flows under pressure for a time and in the course of time, the pressure is reduced and the oil is drawn out or handled by means of a pump. Ordinarily, the oil is supplied to a tank or tanks.

It is obvious that it is not desirable to subject the tanks to just ordinary pressure from the well, nor too great vacuum created by the pump, on account of the liability of collapse.

My valve, in the installation now to be described, will serve to prevent excessive pressure on the tank either within or without, due to pressure from the oil well or to vacuum created by the operation of a pump.

In the drawings herewith, wherein I have illustrated an embodiment of my invention, I have used the reference numeral 10 to indicate generally an oil well from which a pipe 11 conducts oil to a tank 12. The tank 12 has the outlet pipe 13. A branch pipe 14 leads from the pipe 11 to a pipe 15. In the pipe 11 between the pipe 14 and the tank 12 is an ordinary control valve 16. A by-pass pipe 17 is connected with the pipe 11 between the tank 12 and the valve 16 and with the pipe 14.

My improved pressure and vacuum valve A is placed in the pipe 14. In the pipe 14 between the valve A and the tank 15 is a valve 18. A pump 19 discharges to the pipe 17 and has its intake connected by a pipe 20 with the pipe 14 between the valves A and 18. In the pipe 20 is a valve 21.

I will now describe in greater detail my improved pressure and vacuum control valve A.

This valve A has an ordinary body or casing 22, provided with the intake port 23 and the outlet port 24. On the interior of the casing 22 is the partition member 25, having the valve seats 26 and 27. The partition 25 divides the interior of the valve casing 22 into what I shall call for convenience the intake compartment 28 and the outlet compartment 29.

Valves 30 and 31 connected by a post 32 coact with the valve seats 26 and 27.

At what may be called the top of the valve casing 22 is an opening 32, for which there is provided a cover plate 33 secured by bolts 34 to the casing and provided with a central hole 35 from which projects the internally screw-threaded sleeve 36.

I provide a diaphragm casing made in two parts. The lower half 37 of the diaphragm casing has a tubular extension 38 screwed into the sleeve 36, as shown in Figure 2. The casing member 37 has a passage 39 extending through it and the tubular extension 38 communicating with the openings 35 in the plate 33, and thus with the opening 32 in the casing 22 and with the intake compartment 28 of the valve casing.

The diaphragm chamber member 37 is formed with a peripheral flange 40.

The other half of the diaphragm casing comprises an annular, substantially flat ring 41, having projecting away from its inner edge the tubular extension 42. The outer edge of the ring 41 is bolted to the flange 40 by bolts 43. The periphery of a flexible diaphragm 44 is gripped between the ring 41 and the flange 40.

Screwed into the outer end of the tubular extension 42 is one end of a hollow spring housing 45, the other end of which is closed as at 46. A stem 47 of the valves 30 projects through the openings 32 and 35 and through the opening 39 and may be formed with a reduced extension 48, projecting through the diaphragm 44.

On what is the under side of the diaphragm when the parts are in the position shown in Figure 2 is a plate 49 held in place against the diaphragm by a small washer 50 on the portion 48 of the stem 47 and a suitable lock nut 51.

On the stem portion 48 on the other side of the diaphragm is a plate or the like 52 held in place against the diaphragm by lock nuts 53 on the valve stem extension 48. The extreme end of the extension 48 is screwed into a spring post 54, which projects into the spring casing 45, as shown.

On the plate 52 are projecting feet 55. Slidably mounted on the spring post 54 is a spring seat 56, having the opposite, parallel arms 57 projecting alongside the spring post 54. At their upper ends, the arms 57 support and are connected by a ring 58.

Threaded into the upper closed end 46 of the spring 45 is an adjusting screw 59. On the lower end of this screw are spaced nuts 60 and 61. Received between the nuts 60 and 61 on the screw 59 is the end member 62 of a yoke having the arms 63, extending downwardly and projecting just inside the ring 58, and having the outwardly extending feet 64 at their lower ends.

The screw 59 is rotatable in the yoke member 62 and I preferably interpose between the yoke member 62 and the respective nuts 60 and 61, the ball bearings 65 and 66.

It will be seen that the arms 63 of the yoke just mentioned may slide in the ring 58.

The arms 63 are provided with inwardly projecting opposite lugs 67 substantially spaced from the feet 64.

On the upper end of the spring post 54 is a nut 68. Slidably mounted on the post 54 is a nut 69, arranged below the lugs 67. A spring 70 is mounted on the post 54 between the seat 56 and the washer 69.

The parts are so arranged that the yoke formed of the members 62 and 63 may slide with relation to the yoke formed by the arms 57 and the ring 58.

The interior of the extension 42 may be connected with the air by means of a cock 70 71.

I will now describe the operation of my improved valve in the installation used for the purposes of illustration.

The valve may be used for maintaining a fixed pressure on the well. By the use of this valve, the oil and gas in the well are kept under pressure, which has a tendency to prolong the life of the well by keeping back the water.

Assume that the valves 16 and 18 are opened and the valve 21 closed. The adjusting screw 54 is rotated for moving it toward the casing 22 and carrying with it the yoke formed by the members 62 and 63, which may be called the yoke B.

The parts are so shaped and arranged that the lugs 67 engage the washer 69 for compressing the spring 70 and sliding the spring seat 56 against the feet 55, and thus forcing the diaphragm 44 downwardly and toward the valve casing 22. This results in the setting of the valves 30 and 27.

The adjustment may be made for regulating the pressure in the tank 12 at any desired point.

Assuming then that the pressure in the well forces the oil through the pipe 11 to the tank 10, it will be seen that oil will flow into the pipe 14 to the valve A, and this pressure will be imparted to the under side of the diaphragm 44.

Whenever the pressure goes above that for which the valve is set, the diaphragm 44 will be raised, thus unseating the valves 30 and 31 and allowing flow through the pipe 14 to the tank 15. This will relieve the pressure in the pipe 11 and on the tank 12 and on the well.

When the pressure goes down, the spring 70 will seat the valves again, thus maintaining a pressure on the well constantly or maintaining a pressure constantly at any given point, permitting the excess to be relieved when the valve is open.

As illustrative of how my valve may be used for controlling vacuum, it may be noted that in the history of oil wells, the pressure usually goes down after a short time, and it becomes necessary to pump the oil.

Assuming then that this condition has arrived, and that the valves 18 and 16 are closed for operation by the pump, then the valve A is readjusted. The screw 59 is actuated for moving the parts from the position illustrated in Figure 2 for instance to that illustrated in Figure 3.

As the yoke B moves upwardly, the lugs 67 leave the washer 69 and the feet 64 engage the ring 58, whereupon the seat 56 is pulled upwardly, compressing the spring against the washer 69 and raising the post 54 and the diaphragm, and thus opening the valves 30 and 31.

When the pump is operated, the oil is drawn from the pipe 11 through the valve A, and the pipe 20, and through the pump, and thence is forced through the tanks 12 and 15.

Whenever the vacuum becomes so great, that the atmospheric pressure in the upper part of the diaphragm chamber is sufficient to overcome the spring tension, the diaphragm will be forced downwardly, and the valves closed and held closed until the vacuum decreases to the point for which the valve A is set.

It is thus impossible to impose such vacuum on the tanks as would cause them to collapse or on the well as to injure it.

I claim as my invention:

1. In a pressure and vacuum control valve, a valve casing, a partition therein, dividing the casing into inlet and outlet compartments, having a valve port and seat, a valve for cooperating with said seat, a casing having therein a pressure sensitive member connected with the valve and subject on one side to the pressure in one compartment of the valve casing, a spring operatively connected with the pressure sensitive member, and adjustable means for causing the spring to push or pull on such member, according to its adjustment for resisting pressure or suction from the valve casing on said pressure sensitive member.

2. In a pressure and vacuum control valve, a valve casing, a partition therein, dividing the casing into inlet and outlet compartments, having a valve port and seat, a valve for cooperating with said seat, a casing having therein a pressure sensitive member connected with the valve and subject on one side to the pressure in one compartment of the valve casing, and adjustable means for yieldingly impelling the pressure sensitive member to position for holding the valve open or closed, according to the adjustment of said means, said means comprising a post connected with said member having a head and a washer, a spring seat slidable on the post adapted to engage the said member, a spring on the post between the seat and the washer, an adjusting screw, yokes on the screw and seat slidably connected and having means for preventing their separation, and means on the screw yoke for coacting with said washer for compressing the spring.

Des Moines, Iowa, October 12, 1926.

LYLE W. BROWNE.